United States Patent [19]

Raffoni

[11] Patent Number: 5,333,979
[45] Date of Patent: Aug. 2, 1994

[54] LAMINAR JOINING STAPLE

[76] Inventor: Giuseppe Raffoni, Viale Bolognesi 24, 27100 Forli', Italy

[21] Appl. No.: 968,141

[22] Filed: Oct. 29, 1992

[51] Int. Cl.⁵ .............................................. F16B 15/00
[52] U.S. Cl. .................................... 411/477; 411/912; 411/920
[58] Field of Search ............... 411/477, 912, 462, 463, 411/464, 478, 461, 439, 488, 920

[56] References Cited

U.S. PATENT DOCUMENTS

| | | | |
|---|---|---|---|
| 1,959,360 | 5/1934 | Heyser | 411/461 X |
| 2,046,339 | 7/1936 | McChesney | 411/464 |
| 3,507,384 | 4/1970 | Lippitt | 411/464 X |
| 4,058,047 | 11/1977 | Kramer et al. | 411/478 |
| 4,221,153 | 9/1980 | Medina | 411/442 |
| 4,514,126 | 4/1985 | Knowles | 411/477 |
| 4,681,498 | 7/1987 | Raffoni | 411/912 |

FOREIGN PATENT DOCUMENTS 2629151  9/1989  France ................. 411/477

*Primary Examiner*—Rodney M. Lindsey
*Attorney, Agent, or Firm*—Guido Modiano; Albert Josif; Daniel O'Byrne

[57] ABSTRACT

Laminar joining staple formed of a rectangular metallic plate having a cutting edge along one side and at least two ridges arranged symmetrically with respect to the centerline plane of the plate, in which the two ridges include portions which diverge, with respect to the centerline plane, toward the cutting edge.

8 Claims, 1 Drawing Sheet

LAMINAR JOINING STAPLE

BACKGROUND OF THE INVENTION

The present invention relates to a laminar staple for mutually joining wood strips, particularly for joining at an angle profiled strips for manufacturing frames, frameworks and the like.

In the manufacture of picture frames, or wood frameworks for box-like containers and the like, the angled joining of the strips, rods or battens is performed by means of laminar staples which are driven astride the joining line formed by the mutually adjacent arrangement of the preliminarily chamfered ends of the strips. In order to facilitate the driving of the staples, one of their sides has a cutting edge.

Considerable difficulties have been observed, with known staples, in keeping the strips mutually adjacent at the joining plane due to the non-uniformities of the cutting of the strips, due to the roughness of the cutting plane, and due to the imperfect linearity of the strips.

An attempt has been made to obviate these shortcomings by providing staples folded in the shape of a W (for example as shown in U.S. Pat. No. 29,957 and French patent no. 2318715) or provided with slightly converging ridges (as shown in British patent no. 1,165,482) so as to ensure that the heads of the strips are pressed with greater force against each other so as to avoid the forming of cracks. In practice it has been observed that the crack remains, although to a reduced extent, since during driving there is a greater contact pressure of the heads at the tapered part of the strips.

U.S. Pat. No. 4,681,498 in the name of the same Applicant also suggested to shape the staples in the form of a W so that the ridges diverge with respect to an intermediate portion both toward the cutting edge and toward the edge on which the striking mass acts. However, even in this case the improvement obtained was not conclusive.

SUMMARY OF THE INVENTION

The technical aim of the present invention is now to provide a laminar staple for the above described use, conceived so as to further reduce the forming of cracks in the joining line and at the same time increase the strength of the joint.

This aim is achieved by a laminar staple which is characterized in that it comprises a substantially rectangular metallic plate having a cutting edge along one side and at least two ridges arranged symmetrically with respect to a centerline plane which is at right angles to said cutting edge, said two ridges comprising portions which diverge, with respect to the centerline plane, toward the cutting edge.

BRIEF DESCRIPTION OF THE DRAWINGS

Further characteristics and advantages of the invention will become apparent from the following description thereof, with reference to the accompanying drawing, wherein.

DESCRIPTION OF THE PREFERRED EMBODIMENTS

Figure 1:
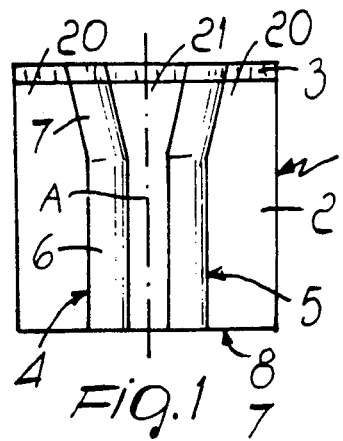
FIG. 1 is a front view of a laminar staple.
Figure 2:
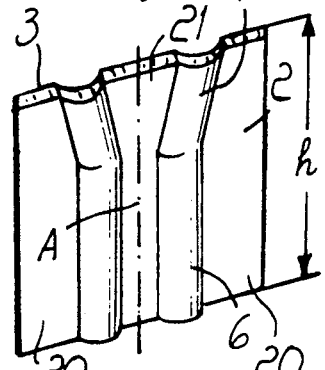
FIG. 2 is a perspective view of the staple shown in FIG. 1.

With reference to FIGS. 1 and 2, the laminar staple, generally designated by the reference numeral 1, comprises a rectangular steel plate 2 having, along one side, a cutting edge 3 suitable to-facilitate its driving.

Two ridges 4 and 5 with a semicircular cross-section are defined in the plate and are arranged symmetrically with respect to a centerline plane A which is at right angles to the cutting edge 3.

Each ridge comprises two portions 6 and 7 which are mutually blended.

In the example of FIGS. 1 and 2, the first portions 6 are parallel to the centerline plane A and cover an extent which, from the striking edge 8, is greater than half of the height "h" of the plate 2. The second portions 7 of the ridges 4 and 5 diverge toward the cutting edge, enclosing an angle which is chosen according to the mechanical and dimensional characteristics of the wood of which the strips to be joined are made.

The fundamental prerogative of the present invention is constituted by the fact that during driving, the divergent portions 7 of the ridges 4 and 5 produce a force which tends to move the strips mutually closer at the joint, whereas the parallel portions 6 guide the staple during driving and retain the strips in mutually adjacent position. As clearly illustrated n the drawing figures, the rectangular steel plate 2 defines two flat lateral portions 20 extending between the cutting edge 3 and the striking edge 8, laterally and externally with respect to the two ridges 4, 5. As can also be clearly seen in the drawing figures, the rectangular steel plate 2 further defines a single uninterrupted planar central portion 21 which extends throughout the height of the plate 2 from the cutting edge 3 to the striking edge 8. The single uninterrupted planar central portion 21 is symmetrical with respect to the centerline plane A, laterally delimited by the two ridges 4, 5 and aligned with the two flat lateral portions 20.

Figure 3:
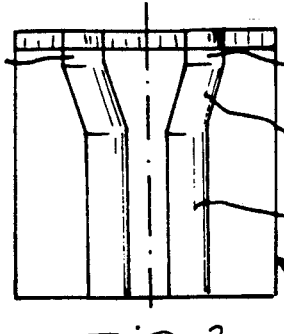
FIGS. 3 to 6 are front views of a corresponding number of variations of the laminar staple according to the invention.
Figure 7:
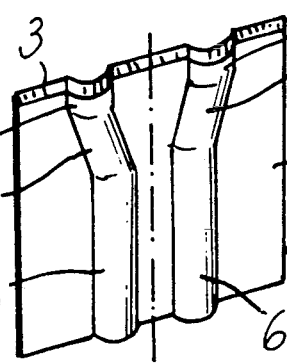
FIGS. 7 to 10 are respective perspective views of the laminar staples of FIGS. 3 to 6.

FIGS. 3 and 7 illustrate a solution in which the ridges 4 and 5 comprise further parallel portions 9 and 10 which extend from the ends of the divergent portions 7 until they affect the cutting edge 3.

Figure 4:
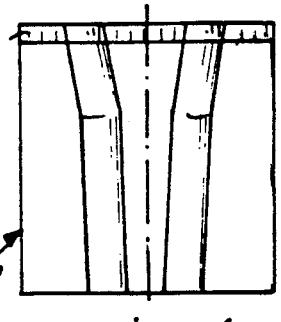
Figure 8:
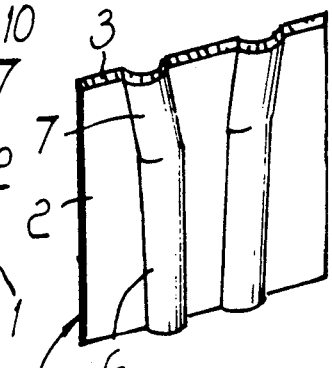

FIGS. 4 and 8 illustrate a staple 1 which duplicates the staple of FIGS. 1 and 2 with the exception of the shape of the portions 6 of the ridges, which also diverge toward the cutting edge 3 but do so less than the portions 7.

It should be noted that the orientation of the ridges is chosen according to the specific requirements, such as wood quality and strip thickness.

Figure 5:
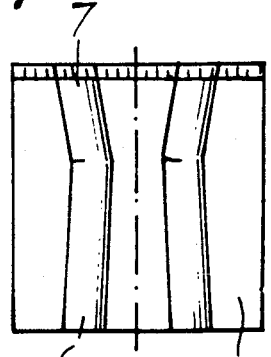
Figure 6:
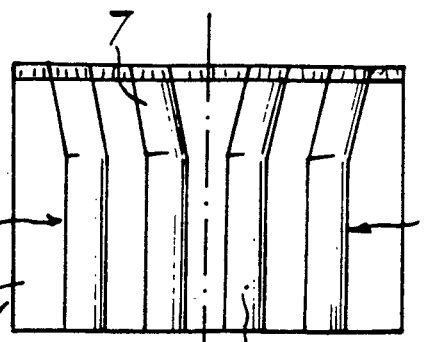
Figure 9:
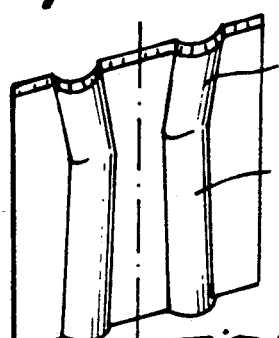
Figure 10:
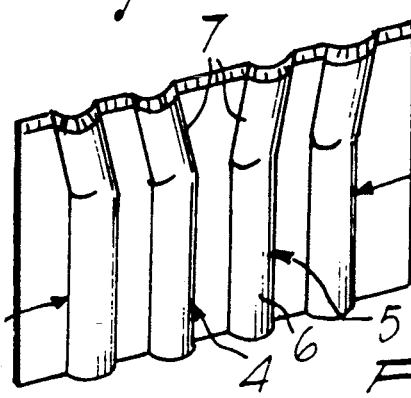

FIGS. 5 and 9 illustrate a solution in which the portions 6 slightly converge toward the cutting edge 3. In this manner it is possible to provide a staple anchoring force, especially when the wood has poor mechanical characteristics. It is possible to increase the number of ridges, as shown in FIGS. 6 and 10, wherein there are two further ridges 11 and 12 having the same orientation as the ridges 4 and 5. However, the shape of the additional ridges can be different in order to provide optimum cooperation to the securing and retention action of the staple.

The described laminar staples can be mutually assembled by glueing or by means of adhesive tapes so as to be available to the user in sets. In a preferred embodiment, the staples form a band and can be mutually distinguished by prefracture lines which facilitate their separation.

Numerous modifications and variations are possible in the practical embodiment of the invention, and all are within the scope of the inventive concept expressed in the claims which follow.

I claim:

1. Laminar jointing staple comprising;
   a rectangular steel plate having a centerline lane;
   a height dimension defined by said plate;
   a cutting edge formed on said plate perpendicularly to said centerline plane;
   a striking edge formed on said plate opposite to said cutting edge and perpendicular to said centerline plane;
   two ridges formed on said plate symmetrically with respect to said centerline plane and extending between said cutting edge and said striking edge, each of said ridges defining a semi-circular cross section;
   first portions defined by each of said ridges symmetrically with respect to said centerline plane, said first portions extending across said plate from said striking edge for a distance greater than half of said height dimension;
   second portions defined by each of said ridges symmetrically with respect to said centerline plane, said second portions mutually diverging apart and extending between said first portions and said cutting edge;
   two flat lateral portions defined by said rectangular steel plate and extending between said cutting edge and said striking edge, laterally and externally with respect to said two ridges, and;
   a single uninterrupted planar central portion defined by said rectangular steel plate and extending between said cutting edge and said striking edge, said single uninterrupted planar central portion being symmetrical with respect to said centerline plane, laterally delimited by said two ridges, and aligned with said two flat lateral portions.

2. Laminar jointing staple according to claim 1, wherein said first portions are parallel to said centerline plane.

3. Laminar jointing staple according to claim 1, wherein said first portions mutually diverge apart in a direction extending towards said cutting edge.

4. Laminar jointing staple according to claim 1, further comprising two further ridges connected to said two flat lateral portions.

5. Laminar jointing staple according to claim 4, further comprising two further flat lateral portions defined by said rectangular steel plate and extending between said cutting edge and said striking edge, laterally and externally with respect to said two further ridges.

6. Laminar jointing staple comprising;
   a rectangular steel plate having a centerline plane;
   a height dimension defined by said plate;
   a cutting edge formed on said plate perpendicularly to said centerline plane;
   a striking edge formed on said plate opposite to said cutting edge and perpendicular to said centerline plane;
   two ridges formed on said plate symmetrically with respect to said centerline plane and extending between said cutting edge and said striking edge, each of said ridges defining a semi-circular cross section;
   first portions defined by each of said ridges symmetrically with respect to said centerline plane, said first portions being substantially parallel to said centerline plane and extending across said plate from said striking edge for a distance greater than half of said height dimension;
   second portions defined by each of said ridges symmetrically with respect to said centerline plane, said second portions mutually diverging apart and extending between said first portions and said cutting edge;
   two flat lateral portions defined by said rectangular steel plate and extending between said cutting edge and said striking edge, laterally and externally with respect to said two ridges, and;
   a single uninterrupted planar central portion defined by said rectangular steel plate and extending between said cutting edge and said striking edge, said single uninterrupted planar central portion being symmetrical with respect to said centerline plane, laterally delimited by said two ridges, and aligned with said two flat lateral portions.

7. Laminar jointing staple according to claim 6, further comprising two further ridges connected to said two flat lateral portions.

8. Laminar jointing staple according to claim 7, further comprising two further flat lateral portions defined by said rectangular steel plate and extending between said cutting edge and said striking edge, laterally and externally with respect to said two further ridges.

* * * * *